(12) United States Patent
Liu

(10) Patent No.: US 12,726,981 B2
(45) Date of Patent: Sep. 1, 2026

(54) COMMUNICATION METHOD FOR UPLINK TRANSMISSION OF PUSCH WITH CG

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 265 days.

(21) Appl. No.: 18/575,229

(22) PCT Filed: Jun. 29, 2021

(86) PCT No.: PCT/CN2021/103151
§ 371 (c)(1),
(2) Date: Dec. 28, 2023

(87) PCT Pub. No.: WO2023/272493
PCT Pub. Date: Jan. 5, 2023

(65) Prior Publication Data
US 2024/0314772 A1 Sep. 19, 2024

(51) Int. Cl.
*H04L 5/00* (2006.01)
*H04W 72/1268* (2023.01)

(52) U.S. Cl.
CPC ....... *H04W 72/1268* (2013.01); *H04L 5/0035* (2013.01)

(58) Field of Classification Search
CPC ..... H04L 1/1642; H04L 47/34; H04L 1/1607; H04L 41/0896; H04L 41/147; H04L 41/16; H04L 41/5006; H04L 41/5009; H04L 41/5019; H04L 43/0876; H04L 43/0882; H04W 28/06; H04W 28/082; H04W 28/0865; H04W 28/09; H04W 76/15; H04W 88/06; H04W 56/0045; H04W 56/00; H04W 56/0015; H04W 56/0065; H04W 28/0263; H04W 28/0268; H04W 28/20; H04W 28/24; H04W 28/02;
(Continued)

(56) References Cited

U.S. PATENT DOCUMENTS

2020/0260486 A1* 8/2020 Zhou ................ H04W 28/0278
2020/0404655 A1 12/2020 Salem
(Continued)

FOREIGN PATENT DOCUMENTS

EP 4333509 A1 * 3/2024 ........ H04W 52/0225
WO WO 2020206083 A1 10/2020

OTHER PUBLICATIONS

PCT/CN2021/103151, International Search Report dated Feb. 25, 2022, 2 pages.
(Continued)

*Primary Examiner* — Nathan S Taylor
(74) *Attorney, Agent, or Firm* — Cozen O'Connor

(57) ABSTRACT

A communication method for uplink transmission of a physical uplink shared channel (PUSCH) with a configured grant (CG) performed by a terminal, including: determining a transmission configuration parameter corresponding to at least one transmission reception point (TRP); and determining an initial transmission position based on the transmission configuration parameter, the initial transmission position being for CG-based multi-TPR PUSCH repetition.

20 Claims, 4 Drawing Sheets configuring and determining a transmission configuration parameter corresponding to at least one TRP in response to configuring a plurality of TRPs for a terminal, and determining an initial reception position based on the transmission configuration parameter, the initial reception position being for CG-based multi-TPR cooperative PUSCH transmission

S21

(58) Field of Classification Search
CPC . H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20
See application file for complete search history.

(56) References Cited

U.S. PATENT DOCUMENTS

2021/0051669 A1 2/2021 Lin et al.
2021/0076387 A1* 3/2021 Papasakellariou .. H04W 52/248
2021/0105812 A1* 4/2021 Rastegardoost ...... H04L 1/1671
2021/0184812 A1* 6/2021 MolavianJazi ....... H04L 1/0041
2021/0266954 A1* 8/2021 Xu ........................ H04L 1/1822
2022/0132534 A1* 4/2022 Jang ...................... H04L 5/0051
2022/0159724 A1* 5/2022 Fan ................... H04W 74/0808
2022/0225395 A1* 7/2022 Xu ........................ H04L 1/1854
2022/0239410 A1* 7/2022 Lim .................. H04W 72/0446
2022/0304042 A1* 9/2022 Yang ..................... H04L 5/0091
2022/0312459 A1* 9/2022 Yang ..................... H04L 1/0025
2022/0330299 A1* 10/2022 Jang .......................... H04L 1/08
2022/0385425 A1* 12/2022 Jang ...................... H04L 5/0051
2022/0394742 A1* 12/2022 Jang .......................... H04L 1/08
2022/0408476 A1* 12/2022 Takahashi ............. H04L 1/1887
2023/0007599 A1* 1/2023 Lim .......................... H04L 1/08
2023/0016937 A1* 1/2023 Jang ..................... H04B 7/0628
2023/0069690 A1* 3/2023 Takahashi ................. H04L 1/08
2023/0156645 A1* 5/2023 Yao ....................... H04L 1/1854
455/12.1
2023/0156646 A1* 5/2023 Yao ................... H04W 74/0833
370/329
2023/0189255 A1* 6/2023 Bagheri ................ H04L 1/1812
370/329
2023/0209530 A1* 6/2023 Rastegardoost ...... H04L 1/1854
370/329
2023/0269814 A1* 8/2023 Rossbach .................. H04L 1/08
370/328
2023/0396373 A1* 12/2023 Gao ........................ H04L 1/189
2024/0008024 A1* 1/2024 Jung ..................... H04L 1/1812
2024/0129900 A1* 4/2024 Xu ........................ H04W 72/20
2024/0205892 A1* 6/2024 Yamamoto ........ H04W 72/0446
2024/0214947 A1* 6/2024 Park ...................... H04L 5/0053
2024/0224209 A1* 7/2024 Lee ....................... H04W 76/30
2024/0235737 A1* 7/2024 Li ........................ H04B 7/0456

OTHER PUBLICATIONS

TCL communication “Enhancements on Multi-TRP for PUCCH and PUSCH” 3GPP TSG RAN WG1 Meeting #105-e, R1-2105837, May 2021, 8 pages.
European Patent Application No. 21947453.3 Search Report dated Apr. 18, 2024, 11 pages.
Indian Patent Application No. 202447005356, Office Action dated Apr. 7, 2026, 9 pages.

* cited by examiner

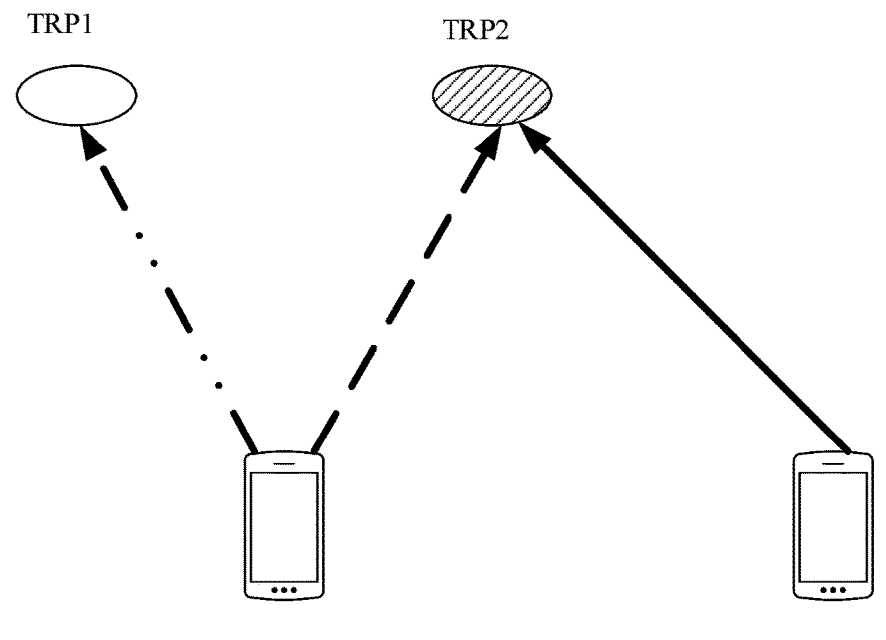
FIG. 1
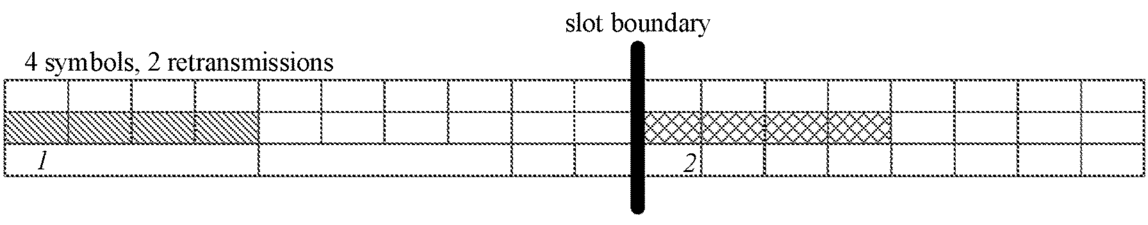
FIG. 2
slot boundary
4 symbols，2 retransmissions
1
2
FIG. 3A
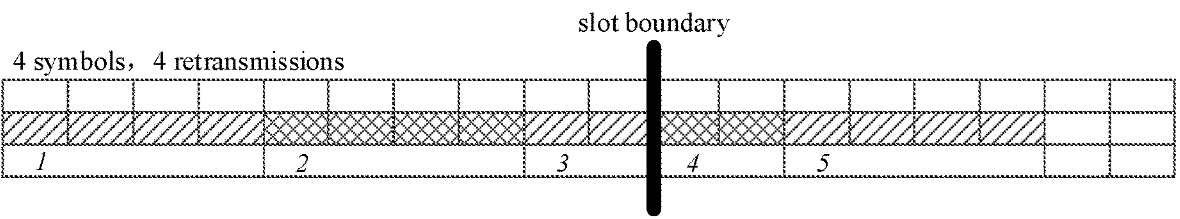
FIG. 3B

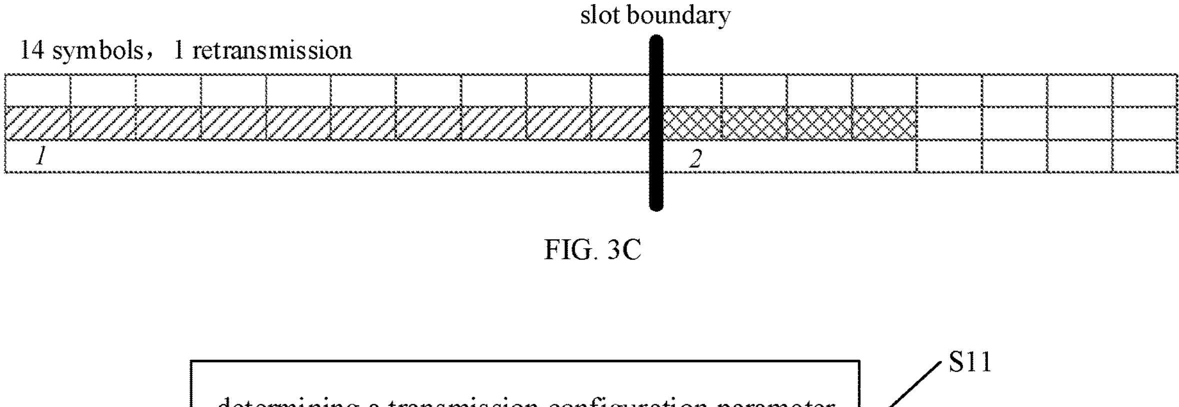

FIG. 3C determining a transmission configuration parameter corresponding to at least one TRP — S11

↓ determining an initial transmission position based on the transmission configuration parameter, the initial transmission position being for CG-based multi-TPR cooperative PUSCH transmission — S12

FIG. 4 configuring and determining a transmission configuration parameter corresponding to at least one TRP in response to configuring a plurality of TRPs for a terminal, and determining an initial reception position based on the transmission configuration parameter, the initial reception position being for CG-based multi-TPR cooperative PUSCH transmission — S21

FIG. 5

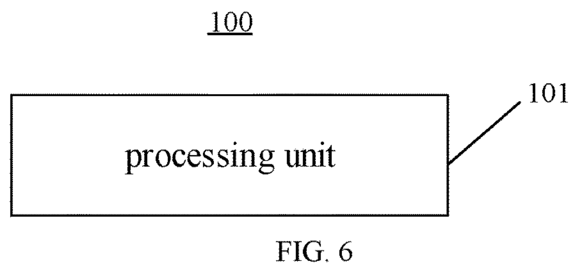

FIG. 6

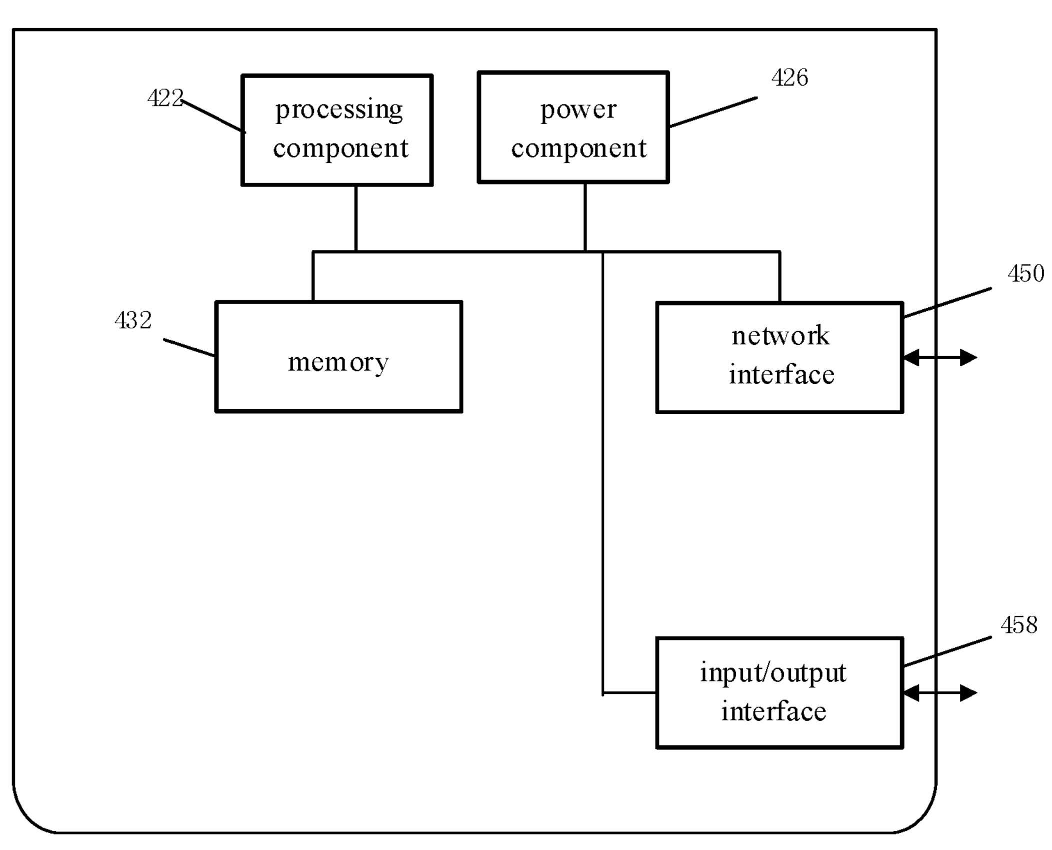
FIG. 9

COMMUNICATION METHOD FOR UPLINK TRANSMISSION OF PUSCH WITH CG

CROSS-REFERENCE TO RELATED APPLICATIONS

The present application is a National Stage of International Application No. PCT/CN2021/103151, filed on Jun. 29, 2021, the contents of which are incorporated herein by reference for all purposes.

FIELD

The present disclosure relates to the field of communication technology, and particularly to a communication method for uplink transmission of a physical uplink shared channel (PUSCH) with a configured grant (CG), a communication device for uplink transmission of a PUSCH with a CG and a storage medium.

BACKGROUND

With development of the communication technology, beam-based transmission and reception needs to be used to ensure a coverage. In a case that a network device (e.g. a base station) has multiple transmission reception points (TRPs), multi-TRP/multi-panel may be used to serve a terminal. The multi-TRP/multi-panel of the network device is applied to improve the signal coverage at a cell edge and provide more balanced service quality in a service area. The multiple TRPs or panels can be used to transmit data cooperatively in different manners. From perspective of network morphology, network deployment with a large number of distributed access points plus centralized baseband processing will be more conducive to provide a balanced rate for the user experience, and significantly reduce delay and signaling overhead caused by handover. By using cooperation among the multiple TRPs or panels to perform channel transmission/reception from multiple beams of multiple angles, block/shelter effect may be addressed, robustness of link connection may be guaranteed, and transmission quality may be improved and reliability requirements may be satisfied for ultra-reliable low latency communication (URLLC) services.

In the R16 study, a physical downlink shared channel (PDSCH) is enhanced based on the application of the downlink multi-point (i.e. multi-TRP/panel) cooperative transmission technology. Since data transmission includes scheduling feedback of uplink and downlink channels, only enhancing a downlink data channel will not guarantee service performance in the URLLC study. Therefore, in the R17 study, a physical downlink control channel (PDCCH), a physical uplink control channel (PUCCH) and a physical uplink shared channel (PUSCH) still need to be enhanced.

An uplink enhancement scheme based on the multi-TRP is based on a PUCCH/PUSCH repetition scheme of R16. In an uplink transmission scheme of R16, the PUCCH supports repetitions between time slots. The PUSCH for scheduling grant supports a mode of repetition Type A between the time slots and a mode of repetition Type B across the time slots. An uplink enhancement scheme of the multi-TRP of R17 is based on the PUSCH repetition scheme of R16. In the multi-TRP enhancement of R17, the PUSCH supports cooperative transmission of one transport block (TB) in different TRP directions and on different transmission occasions (TO), to further apply spatial multiplexing transmission to improve the transmission reliability.

Regarding service of the uplink transmission of the CG-based PUSCH (also referred as CG PUSCH), repetition of a data block shall not exceed a periodic boundary. As a result, after the data arrives, an actual number of repetition transmissions is less than a configured number of transmissions, and thus the actual coverage and the performance of the service will be affected, e.g., for a terminal service with high requirements for both delay and reliability. Therefore, the CG PUSCH transmission in a multi-TRP scenario needs to be further improved.

SUMMARY

According to a first aspect of embodiments of the present disclosure, there is provided a communication method for uplink transmission of a physical uplink shared channel (PUSCH) with a configured grant (CG), performed by a terminal, including: determining a transmission configuration parameter corresponding to at least one transmission reception point (TRP); and determining an initial transmission position based on the transmission configuration parameter, the initial transmission position being for CG-based multi-TPR PUSCH repetition.

According to a second aspect of embodiments of the present disclosure, there is provided a communication method for uplink transmission of a physical uplink shared channel (PUSCH) with a configured grant (CG), performed by a network device, including: configuring and determining a transmission configuration parameter corresponding to at least one TRP in response to configuring a plurality of TRPs for a terminal, and determining an initial reception position based on the transmission configuration parameter, the initial reception position being for CG-based multi-TPR PUSCH repetition.

According to a third aspect of embodiments of the present disclosure, there is provided a terminal, including: a processor; and a memory for storing processor-executable instructions. The processor is configured to perform the communication method for the uplink transmission of the PUSCH with the CG described in the first aspect or any one of embodiments of the first aspect.

According to a fourth aspect of embodiments of the present disclosure, there is provided a network device, including: a processor; and a memory for storing processor-executable instructions. The processor is configured to perform the communication method for the uplink transmission of the PUSCH with the CG described in the second aspect or any one of embodiments of the second aspect.

According to a fifth aspect of embodiments of the present disclosure, there is provided a non-transitory computer-readable storage medium having instructions that, when executed by a processor of a terminal, cause the terminal to perform the communication method for the uplink transmission of the PUSCH with the CG described in the first aspect or any one of embodiments of the first aspect.

According to an eighth aspect of embodiments of the present disclosure, there is provided a non-transitory computer-readable storage medium having instructions that, when executed by a processor of a network device, cause the network device to perform the communication method for the uplink transmission of the PUSCH with the CG described in the second aspect or any one of embodiments of the second aspect.

It is to be understood that both the foregoing general description and the following detailed description are explanatory only, and shall not be construed to limit the present disclosure.

BRIEF DESCRIPTION OF THE DRAWINGS

The accompanying drawings, which are incorporated in and constitute a part of this specification, illustrate embodiments in line with the present disclosure and, together with the description, serve to explain the principle of the present disclosure.

FIG. 1 is a schematic diagram illustrating a wireless communication system according to an embodiment.

FIG. 2 is a schematic diagram illustrating a PUSCH repetition Type A.

FIGS. 3A to 3C are schematic diagrams illustrating a PUSCH repetition Type B.

FIG. 4 is a flow chart of a communication method for uplink transmission of a PUSCH with a CG according to an embodiment.

FIG. 5 is a flow chart of a communication method for uplink transmission of a PUSCH with a CG according to an embodiment.

FIG. 6 is a block diagram illustrating a communication device for uplink transmission of a PUSCH with a CG according to an embodiment.

FIG. 9 is a block diagram illustrating a communication device for uplink transmission of a PUSCH with a CG according to an embodiment.

DETAILED DESCRIPTION

Figures 7, 8:
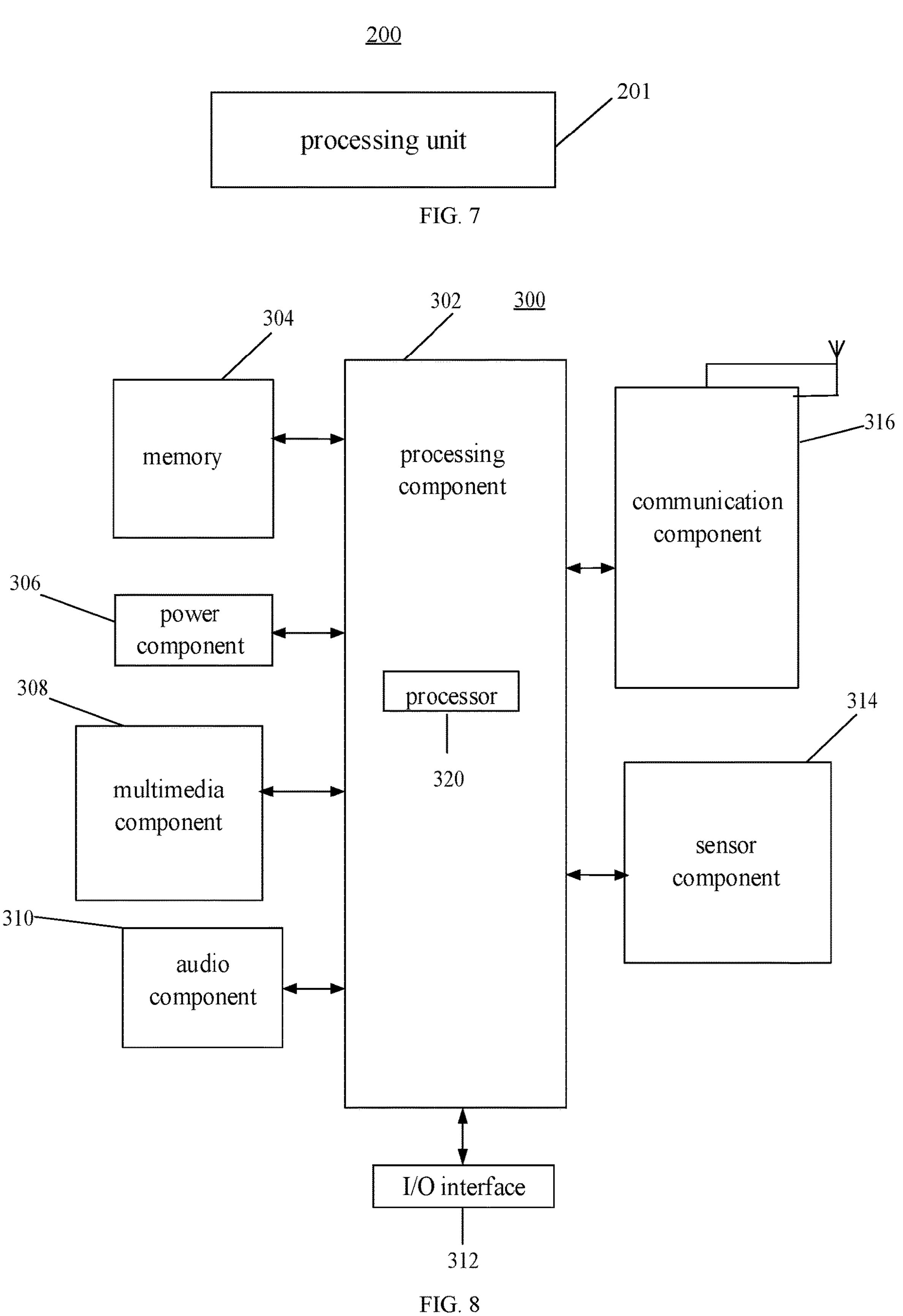
FIG. 7 is a block diagram illustrating a communication device for uplink transmission of a PUSCH with a CG according to an embodiment.
FIG. 8 is a block diagram illustrating a communication device for uplink transmission of a PUSCH with a CG according to an embodiment.

Embodiments will be described in detail herein, examples of which are illustrated in the accompanying drawings. The following description refers to the accompanying drawings in which the same reference numerals in different drawings represent the same or similar elements unless otherwise represented. The implementations set forth in the following description of the embodiments do not represent all implementations in line with the present disclosure. Instead, they are merely examples of devices and methods in line with aspects related to the present disclosure as recited in the appended claims.

The communication method for the uplink transmission of the PUSCH with the CG (also referred to as the communication method for the uplink CG PUSCH transmission/repetition) provided by embodiments of the present disclosure may be applied to a wireless communication system shown in FIG. 1. Referring to FIG. 1, the wireless communication system includes a network device and a terminal. The terminal is connected to the network device through wireless resources and transmits data. Data transmission is performed between the network device and the terminal based on a beam. PUSCH uplink transmission between the network device and the terminal may be enhanced according to the multi-TRP.

It may be understood that at least one TRP may be used by the network device to transmit the data to the terminal based on the multi-TRP. In the wireless communication system shown in FIG. 1, the data transmission between the network device with TRP1 and TRP2 and terminal 1 and terminal 2 is only for schematic illustration and is not limited thereto.

It may be further understood that the wireless communication system shown in FIG. 1 is only for schematic illustration. The wireless communication system may further include other network devices, such as core network devices, wireless relay devices, and wireless backhaul devices, which are not shown in FIG. 1. The number of network devices and the number of terminals included in the wireless communication system are not limited in embodiments of the present disclosure.

It may be further understood that the wireless communication system in the embodiments of the present disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. The network may be classified into a 2nd generation (2G) network, a 3G network, a 4G network, or a future evolution network, such as a 5G network, which may also be referred to as a new radio (NR) network, according to capacity, rate, delay and other factors of different networks. For ease of description, a wireless communication network will be sometimes abbreviated as a network in the present disclosure.

Further, the network device involved in the present disclosure may also be referred to as a radio access network device. The radio access network device may be a base station, an evolved node B, a home base station, an access point (AP) in a wireless fidelity (WIFI) system, a wireless relay node, a wireless backhaul node, a transmission point (TP), a transmission and reception point (TRP), or the like, or may also be a gNB in the NR system, or may also be a component or a part of a device that constitutes a base station. It is to be understood that the specific technology and specific device form used by the network device are not limited in the embodiments of the present disclosure. In the present disclosure, the network device may provide communication coverage for a particular geographic area and may communicate with terminals located within the coverage area (cell). The network device may also be a vehicle-mounted device when it is used in a vehicle to everything (V2X) communication system.

Further, the terminal involved in the present disclosure, which may also be referred to as a terminal device, a user equipment (UE), a mobile station (MS), a mobile terminal (MT), etc., and it is a device that provides voice and/or data connectivity to a user. For example, the terminal may be a handheld device or a vehicle-mounted device with a wireless connection function. At present, for example, the terminal may be a mobile phone, a pocket personal computer (PPC), a palmtop computer, a personal digital assistant (PDA), a notebook computer, a tablet computer, a wearable device, a vehicle-mounted device, or the like. In addition, the terminal device may be vehicle-mounted device when it is used in a vehicle to everything (V2X) communication system. It is to be understood that the specific technology and specific device form used by the terminal are not limited in the embodiments of the present disclosure.

In embodiments of the present disclosure, data transmission between the network device and the terminal is performed based on a beam. The network device and the terminal may enhance the PUCCH based on a coordinated multi-point transmission technology over multiple TRPs/panels.

The multi-TRP based uplink enhancement scheme is based on a PUCCH/PUSCH repetition scheme of R16. Repetition between time slots is supported in the PUCCH uplink transmission scheme of R16. The uplink transmission scheme of R16 supports a mode of repetition Type A between the time slots and a mode of repetition Type B across the time slots for a scheduling grant PUSCH. Non-CG and CG PUSCH transmissions are described below.

Regarding the scheduled PUSCH, there are generally two uplink PUSCH time domain repetition enhancement modes, i.e., the mode of repetition Type A and the mode of repetition Type B introduced by R16.

1) Transmission mode of PUSCH repetition Type A

FIG. 2 is a schematic diagram illustrating a PUSCH repetition Type A. Referring to FIG. 2, one PUSCH transmission is performed in K consecutive slots, i.e. K transmission occasions. The transmission starts on an $S^{th}$ symbol in a starting slot. Each transmission occasion lasts L symbols, while S+L symbols may not exceed a slot boundary. The PUSCH transmission with Release 16 (i.e., Rel-16, R16) slot aggregation is not suitable for situations where delay requirements are low and reliability requirements are high.

2) Transmission mode of PUSCH repetition Type B

In order to reduce the delay and improve the reliability, Rel-16 supports the PUSCH repetition scheme in a unit of mini-slot, and allowing the PUSCH transmission across the time slots may further reduce the delay. In the time domain, one PUSCH starts the transmission on an $S^{th}$ symbol a in a starting slot, the transmission is performed continuously on K transmission occasions (i.e. corresponding to nominal repetition), and each transmission occasion occupies L symbols back-to-back, and transmission of S+L symbols may cross the slot boundary. When the transmission occasion exceeds the slot boundary, the transmission is re-split. For the entire transmission, the time slot of L*K represents a time window length of the PUSCH transmission, and a DL symbol and other invalid symbols will be discarded and not used for the PUSCH transmission. FIGS. 3A to 3C are schematic diagrams illustrating the PUSCH repetition Type B. FIG. 3A is an example of repetitions corresponding to a case where K=2, L=4, and S=4. FIG. 3B is an example of repetitions corresponding to a case where K=4, L=4, and S=4. FIG. 3C is an example of repetitions corresponding to a case where K=1, L=14, and S=4.

Transmission parameters of the PUSCH repetition Type A and the PUSCH repetition Type B as mentioned above are defined in Table 1.

TABLE 1

| PUSCH | Normal cyclic prefix | | | Extended cyclic prefix | | |
|---|---|---|---|---|---|---|
| mapping type | S | L | S + L | S | L | S + L |
| Type A (repetition Type A only) | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} for repetition Type A, {1, . . . , 27} for repetition Type B | {0, . . . , 11} | {1, . . . , 12} | {1, . . . , 12} for repetition Type A, {1, . . . , 23} for repetition Type B |

Further, redundancy version (RV) matching mapping is required for the PUSCH repetition Type A and the PUSCH repetition Type B.

The RV is defined as follows.

TABLE 2

| Redundancy version for PUSCH transmission | | | | |
|---|---|---|---|---|
| $rv_{id}$ indicated by | $rv_{id}$ to be applied to $n^{th}$ transmission occasion (repetition Type A) or $n^{th}$ actual repetition (repetition Type B) | | | |
| DCI scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Corresponding to the PUSCH repetition Type A, the RV mapping is directly mapped on the transmission occasions corresponding to all nominal repetitions, and a RV field in the downlink control information (DCI) indicates an initial value of a RV sequence. Corresponding to the PUSCH repetition Type B, the RV mapping is directly mapped on the transmission occasions corresponding to actual repetitions, and the RV field in the DCI indicates the initial value of the RV sequence.

The uplink transmission of the CG PUSCH supports two CG schemes in the uplink, and the difference between the two lies in the way of activation.

Configured grant type 1: an uplink grant is provided by radio resource control (RRC), including activation of the grant. It comes into force once the RRC configuration is properly received. All transmission parameters, including period, time offset and frequency resources, as well as a modulation and coding mode used for the uplink transmission, are configured through RRC signaling. After receiving the RRC configuration, the terminal starts the transmission using configured grant at a moment given by the period and the offset. The offset is used to control a moment at which the terminal is allowed to perform the transmission.

Configured grant type 2: the transmission period is provided by the RRC, and the network device realizes resource activation and configuration of a part of transmission parameters through the DCI, thereby realizing the activation and transmission of the grant configuration. After the terminal receives an activation command, the terminal will perform the transmission according to a pre-configured period if there is data to be transmitted in buffer, and the terminal will not transmit any data if there is no data. A moment for the PDCCH transmission specifies an activation time. The terminal confirms activation/deactivation of the configured grant type 2 according to media access control (MAC) signaling for uplink transmission.

The CG transmission scheme, i.e. the CG PUSCH transmission of the uplink CG PUSCH may be applied to the repetition Type A and the repetition Type B with advantages of reducing overhead of the control signaling and, to some extent, reducing the delay before the uplink data transmission. This is because there is no need to schedule a process of requesting the grant before the data transmission.

In multi-TRP enhancement of R17, the PUSCH supports cooperative transmission of the same transport block (TB) in different TRP directions and on different transmission occasions (TOs) in the above-defined transmission modes to further apply spatial multiplexing transmission to improve the transmission reliability.

In standardization discussion of R17, two methods may be considered for joint cooperative transmission oriented to the multiple TRPs regarding the CG PUSCH transmission based on the multi-TRP.

With a single CG PUSCH configuration, same TB is transmitted in the different TRP directions, that is, in K transmissions of the same set, different sets of TOs are used for the PUSCH transmission to different TRPs, and selection of a set of TOs is determined by means of beam mapping.

Multiple mapping schemes may be considered for a mapping relationship between directions of beams of the PUCCH/PUSCH transmitted by the terminal to different TRPs, and different transmission occasions. Three typical beam mapping schemes are exemplified as follows.

Scheme a: periodic mapping. Two beam directions are alternately and circularly mapped onto multiple configured transmission occasions, for example, in a case that four transmissions are performed, a pattern of beam direction mapping is #1 #2 #1 #2.

Scheme b: continuous mapping. The two beam directions are successively and circularly mapped onto the multiple configured transmission occasions, for example, in a case that the four transmissions are performed, the pattern of the beam direction mapping is #1 #1 #2 #2, and in a case that more than four transmissions are performed, the pattern is repeated. For example, in a case that eight transmissions are performed, a pattern of TCI state mapping is #1#1 #2 #2 #1 #1 #2 #2.

Scheme c: half-and-half mapping. The two beam directions are successively mapped onto the multiple configured transmission occasions, for example, in a case that the eight transmissions are performed, the pattern of the beam direction mapping is #1 #1 #1 #1 #2 #2 #2 #2.

The same TB may be sent to the different TRP directions through multiple CG PUSCH configurations, i.e. applying different sets of TOs on different CG PUSCH configurations to send the PUSCH towards the different TRPs, and different beam directions used may be specified by the RRC or determined by activating the DCI signaling.

Regarding the service of the uplink transmission of the CG PUSCH, repetition of the data block shall not exceed a periodic boundary, resulting in that after the data arrives, an actual number of repetition transmissions is less than a configured number of transmissions, and thus the actual coverage and the performance of the service will be affected, e.g., for a terminal service with high requirements for both delay and reliability.

The communication method for the uplink transmission of the PUSCH with the CG provided by embodiments of the present disclosure is based on a CG PUSCH enhanced transmission method based on the multi-TRP. For example, in multi-TRP based enhancement of R17, an initial transmission position in the CG PUSCH enhancement transmission is designed by overall consideration of data transmission and RV configuration transmission mechanism in the multi-TRP scenario.

FIG. 4 is a flow chart of a communication method for uplink transmission of a PUSCH with a CG according to an embodiment. As shown in FIG. 4, the communication method for the uplink transmission of the PUSCH with the CG is applied to the terminal and includes the following steps.

In S11, a transmission configuration parameter corresponding to at least one TRP is determined.

In S12, the initial transmission position is determined based on the transmission configuration parameter, the initial transmission position is for CG-based multi-TPR cooperative PUSCH transmission (i.e., for data transmission of the CG PUSCH adopted for multi-TRP cooperative transmission of a transport block).

In embodiments of the present disclosure, the transmission configuration parameter may include a TO, and may further include a parameter of startingFromRV0.

In one embodiment, the transmission configuration parameter at least includes at least one transmission occasion. The terminal may determine the initial transmission position based on the at least one transmission occasion.

In one embodiment, the transmission configuration parameter includes a parameter of startingFromRV0, and the parameter of startingFromRV0 is configured to be "off". In a case that the initial transmission position is determined based on the at least one transmission occasion, a first transmission occasion is determined based on the at least one transmission occasion, and the first transmission occasion is determined as the initial transmission position.

Further, in embodiments of the present disclosure, the first transmission occasion may be determined based on the at least one transmission occasion according to a number of uplink CG-based PUSCH configurations for cooperative repetition of PUSCH data.

In one embodiment, determining the first transmission occasion based on the at least one transmission occasion in response to the cooperative repetition of the PUSCH data based on a single uplink CG-based PUSCH configuration includes one of the following manners or a combination thereof.

(A) A first transmission occasion among all transmission occasions corresponding to the at least one TRP is determined as a first transmission occasion for the single uplink CG-based PUSCH configuration. That is, the initial transmission position only starts from the first transmission occasion corresponding to all TOs.

(B) A first transmission occasion among transmission occasions corresponding to a direction of a first TRP of the at least one TRP is determined as a first transmission occasion for the single uplink CG-based PUSCH configuration.

The at least one TRP includes N TRPs, an $i^{th}$ TRP among the N TRPs corresponds to an $i^{th}$ sounding reference signal (SRS) resource set, where i is a positive integer greater than or equal to 1 and less than or equal to N, and a first SRS resource set is a resource set with a minimum SRS resource set identifier.

In one example, the at least one TRP includes two TRPs (TRP1 and TRP2). A first TRP corresponds to a first SRS resource set, and a second TRP corresponds to a second SRS resource set. The initial transmission position shall start from the first transmission occasion in the TOs corresponding to the first TRP direction (the sending direction of the first TRP does not necessarily correspond to the TRP1 or the first SRS resource set).

In a case that the CG PUSCH is configured/indicated with TRP reversing transmission, the direction of the first TRP corresponds to a sending direction of the TRP2, a direction of a second TRP corresponds to a sending direction of the TRP1. In this case, a first TO corresponds to the sending direction of the TRP2.

The first TRP involved above is determined in one of following manners: (A) a first TRP that is not reversed among the at least one TRP is determined as the first TRP via configuration signaling or indication signaling or a predefined manner; (B) a first TRP that is reversed among the at least one TRP is determined as the first TRP via configuration signaling or indication signaling or a predefined manner; (C) any non-first TRP among the at least one TRP is determined as the first TRP. For example, the at least one TRP includes two TRPs, and the first TRP may start from the first transmission occasion in the TOs corresponding to the first TRP direction, and may also start from the first transmission occasion in the TOs corresponding to the second TRP direction.

In one embodiment, determining the first transmission occasion based on the at least one transmission occasion in response to the cooperative repetition of the PUSCH data based on a plurality of uplink CG-based PUSCH configurations includes one of the following manners or a combination thereof.

(A) A first transmission occasion among transmission occasions corresponding to a cooperative uplink CG-based PUSCH configuration corresponding to the first TRP direction is determined as a first transmission occasion for the CG-based multi-TPR cooperative PUSCH transmission. That is, the initial transmission position corresponding to each CG PUSCH configuration for the cooperative transmission starts from the transmission occasion determined by first cooperative mapping.

(B) A first transmission occasion among transmission occasions corresponding to a first cooperative uplink CG-based PUSCH configuration corresponding to a sending direction of a first TRP among the at least one TRP is determined as a first transmission occasion for the CG-based multi-TPR cooperative PUSCH transmission. That is, it only ensures that the initial transmission position corresponding to the CG PUSCH configuration for the cooperative transmission starts from a transmission occasion determined by first cooperative mapping corresponding to the CG PUSCH configuration corresponding to the sending direction of the first TRP.

(C) A first transmission occasion among transmission occasions corresponding to a first cooperative uplink CG-based PUSCH configuration corresponding to a TRP sending direction of any non-first TRP among the at least one TRP is determined as a first transmission occasion for the CG-based multi-TPR cooperative PUSCH transmission. That is, the initial transmission position corresponding to the CG PUSCH configuration for the cooperative transmission is allowed to start from a transmission occasion determined by first cooperative mapping corresponding to the CG PUSCH configuration corresponding to the sending direction of the second TRP.

In one embodiment, the transmission configuration parameters include the parameter of startingFromRV0, and the parameter of startingFromRV0 is configured to be “on”. The initial transmission position is determined based on the at least one transmission occasion, which may be that the initial transmission position is determined based on a starting position of any transmission occasion with a corresponding rate matching parameter being RV0 among the at least one transmission occasion.

In one embodiment, determining the initial transmission position based on the starting position of any transmission occasion with the corresponding rate matching parameter being RV0 among the at least one transmission occasion in response to performing data transmission of the single uplink CG-based PUSCH configuration includes one of the following manners or a combination thereof.

(A) A starting position of any transmission occasion with a rate matching parameter being RV0 corresponding to all the transmission occasions corresponding to the at least one TRP is determined as an initial transmission position for performing the data transmission of the single uplink CG-based PUSCH configuration. That is, the initial transmission position may only start from any transmission occasion of RV0 among all the TOs.

(B) A starting position of any transmission occasion with a rate matching parameter being RV0 corresponding to a first TRP direction among the at least one TRP is determined as an initial transmission position for performing the data transmission of the single uplink CG-based PUSCH configuration. That is, the data transmission always starts from any position of RV0 on the corresponding set of TOs for the transmission towards the first TRP direction.

The first TRP includes one of: a first TRP that is not reversed among the at least one TRP; a first TRP that is reversed among the at least one TRP; any non-first TRP among the at least one TRP.

In one example, the at least one TRP includes two TRPs (TRP1 and TRP2). The first TRP corresponds to the first SRS resource set, and the second TRP corresponds to the second SRS resource set. The initial transmission position may only start from the first transmission occasion in the TOs corresponding to the direction of the first TRP direction (the sending direction of the first TRP does not necessarily correspond to the TRP1 or the first SRS resource set).

In one embodiment, determining the initial transmission position based on the starting position of any transmission occasion with the corresponding rate matching parameter being RV0 among the at least one transmission occasion in response to the cooperative repetition of PUSCH data based on a plurality of uplink CG-based PUSCH configurations includes one of the following manners or a combination thereof.

(A) A starting position of any transmission occasion with a rate matching parameter being RV0 on an uplink CG-based PUSCH corresponding to a transmission of the first TRP that is not reversed among the at least one TRP is determined as an initial transmission position for performing data transmission of the plurality of uplink CG-based PUSCH configurations.

(B) A starting position of any transmission occasion with a rate matching parameter being RV0 on an uplink CG-based PUSCH corresponding to a transmission of the first TRP that is reversed among the at least one TRP is determined as an initial transmission position for performing data transmission of the plurality of uplink CG-based PUSCH configurations. The data transmission may start from any TO position corresponding to RV0 in all the CG PUSCH configurations, i.e., the transmission is allowed to start from the second TRP.

(C) A starting position of any transmission occasion with a rate matching parameter being RV0 on an uplink CG-based PUSCH corresponding to transmissions of all TRPs of the at least one TRP is determined as an initial transmission position for performing data transmission of the plurality of uplink CG-based PUSCH configurations.

Further, in embodiments of the present disclosure, in a case that the signaling indicates that the initial transmission position starts from the first transmission occasion in the TOs corresponding to the second TRP direction, whether the first transmission occasion is for TRP1 or the TRP2 is not determined. In this case, in a case that the CG PUSCH is not configured/indicated with the TRP reversing transmission, if the initial transmission position starts from the first transmission occasion in the TOs corresponding to the second TRP direction, corresponding TRPs mapping on all TOs for the pending transmission may be reversed in a pre-defined manner, namely, the TRP2 is reversed to the TRP1, and the TRP1 is reversed to the TRP2.

In one embodiment, a TRP reversing is performed on a TRP corresponding to a transmission occasion for pending transmission in response to determining that the first TRP being any non-first TRP among the at least one TRP, and the uplink CG-based PUSCH is configured with no TRP reversing information.

In the embodiments of the present disclosure, applying a “flexible start” transmission mechanism of the CG PUSCH in the multi-TRP scenario may enhance the coverage performance, reduce the traffic delay, ensure the transmission reliability and improve the system performance.

Based on the communication method for the uplink transmission of the PUSCH with the CG provided in the above-mentioned embodiments, it may be understood that it is a multi-TRP CG PUSCH enhanced transmission method, and may include the following methods for determining the initial transmission position.

I. For a Case where a Single CG PUSCH Configuration Supports the Multi-TRP Cooperative Transmission In a case where the parameter of startingFromRV0 is configured to be off, the initial transmission position may be determined as follows:

- Alt1-1: the initial transmission position may only start from the first transmission occasion corresponding to all TOs;
- Alt1-2: the initial transmission position may only start from the first transmission occasion in the TOs corresponding to the first TRP direction (the first TRP direction does not necessarily correspond to the TRP1 or the first SRS resource set);

In a case that the CG PUSCH is configured/indicated with the TRP reversing transmission, the first TRP direction corresponds to the sending direction of the TRP2, the second TRP direction corresponds to the sending direction of the TRP1, and in this case the first TO corresponds to the sending direction of the TRP2;

- Alt1-3: the initial transmission position may start from the first transmission occasion in the TOs corresponding to the second TRP direction;
- Alt1-4: in a case that the CG PUSCH is not configured/indicated with the TRP reversing transmission, if the initial transmission position starts from the first transmission occasion in the TOs corresponding to the second TRP direction, the corresponding TRPs mapping on all TOs for the pending transmission may be reversed in the pre-defined manner, that is, the TRP2 is reversed to the TRP1, and the TRP1 is reversed to the TRP2.

In a case where the parameter of startingFromRV0 is configured to be on, the initial transmission position is determined as follows:

- Alt.2-1: the initial transmission position may only start from any transmission occasion of RV0 corresponding to all TOs;
- Alt.2-2: the data transmission always starts from any position of RV0 on the corresponding set of TOs for the transmission towards the first TRP direction;
- Alt.2-3: the data transmission may start from any position of RV0 on the TO corresponding to the second TRP direction, i.e., the transmission is allowed to start from the second TRP direction;
- Alt.2-4: in a case that the CG PUSCH is not configured/indicated with the TRP reversing transmission, the initial transmission position may start from any position of RV0 on all TOs, and if the transmission occasion corresponds to the second TRP direction, the corresponding TRP mapping directions for all TOs for the pending transmission are reversed, that is, the TRP2 is reversed to the TRP1, and the TRP1 is reversed to the TRP2.

II. For a Case where a Plurality of CG PUSCH Configurations Support the Multi-TRP Cooperative Transmission In a case where the parameter of startingFromRV0 is configured to be off, the initial transmission position is determined as follows:

- Alt.3-1: the initial transmission position corresponding to each CG PUSCH configuration for the cooperative transmission may only start from the transmission occasion determined by the first cooperative mapping;
- Alt.3-2: it only ensures that the initial transmission position corresponding to the CG PUSCH configuration for the cooperative transmission starts from the transmission occasion determined by the first cooperative mapping corresponding to the CG PUSCH configuration corresponding to the first TRP sending direction;
- Alt.3-3: the initial transmission position corresponding to the CG PUSCH configuration for the cooperative transmission is allowed to start from the transmission occasion determined by the first cooperative mapping corresponding to the CG PUSCH configuration corresponding to the second TRP sending direction.

In the case where the parameter of startingFromRV0 is configured to be on, the initial transmission position is determined as follows:

- Alt.4-1: the data transmission start may start from any TO position of RV0 on the CG PUSCH configuration corresponding to the first TRP;
- Alt.4-2: the data transmission start may start from any TO position corresponding to RV0 of all CG PUSCH configurations, i.e., the transmission is allowed to start from the second TRP;
- Alt.4-3: in a case that the CG PUSCH is not configured/indicated with the TRP reversing transmission, the data transmission may start from a TO position corresponding to any RV0 of all CG PUSCH configurations, and if the corresponding transmission occasion is for the second TRP direction, all the TRP directions of the CG PUSCH for the pending transmission are reversed, that is, the TRP2 is reversed to the TRP1, and the TRP1 is reversed to the TRP2.

The technical solution provided by embodiments of the present disclosure may include the following beneficial effects. The terminal determines the initial transmission position based on the transmission configuration parameter of the at least one TRP, the initial transmission position is for the CG-based multi-TPR PUSCH repetition, that is, the initial transmission position is a starting position of data transmission of the CG PUSCH adopted (by the terminal) for multi-TRP cooperative transmission of the transport block. In this way, the initial transmission position is configured flexibly and the coverage performance is improved.

Based on the same concept, a communication method for uplink transmission of a PUSCH with a CG applied to a network device is further provided in embodiments of the present disclosure to enable the terminal and the network device to perform data transmission and reception in a consistent manner when performing the uplink transmission of the CG-based PUSCH.

FIG. 5 is a flow chart of a communication method for uplink transmission of a PUSCH with a CG according to an embodiment. As shown in FIG. 5, the communication method for the uplink transmission of the PUSCH with the CG is applied to the network device and includes the following step.

In S21, a transmission configuration parameter corresponding to at least one TRP is configured and determined in response to configuring a plurality of TRPs for a terminal, and an initial reception position is determined based on the transmission configuration parameter, the initial reception position is for CG-based multi-TPR cooperative PUSCH transmission (i.e., for data transmission of the CG PUSCH adopted by the terminal for multi-TRP cooperative transmission of a transport block).

In one embodiment, the transmission configuration parameter at least includes at least one transmission occasion, and the initial reception position is determined based on the at least one transmission occasion.

In one embodiment, the transmission configuration parameter includes a parameter of startingFromRV0, and the parameter of startingFromRV0 is configured to be off. The first transmission occasion is determined based on the at least one transmission occasion, and the first transmission occasion is determined as the initial reception position.

In one embodiment, determining the first transmission occasion based on the at least one transmission occasion in response to cooperative repetition of PUSCH data based on the single uplink CG-based PUSCH configuration includes one of the following manners or a combination thereof: determining the first transmission occasion among all transmission occasions corresponding to the at least one TRP as the first transmission occasion for the single uplink CG-based PUSCH configuration; determining the first transmission occasion among transmission occasions corresponding to the direction of the first TRP of the at least one TRP as the first transmission occasion for the single uplink CG-based PUSCH configuration, where the at least one TRP includes N TRPs, an $i^{th}$ TRP among the N TRPs corresponds to an $i^{th}$ SRS resource set, where i is the positive integer greater than or equal to 1 and less than or equal to N, and the first SRS resource set is a resource set with the minimum SRS resource set identifier.

The first TRP is determined in one of following manners: determining the first TRP which is not reversed among the at least one TRP via configuration signaling or indication signaling or the predefined manner as the first TRP; determining the first TRP which is reversed among the at least one TRP via configuration signaling or indication signaling or the predefined manner as the first TRP; determining any non-first TRP among the at least one TRP as the first TRP.

In one embodiment, determining the first transmission occasion based on the at least one transmission occasion in response to cooperative repetition of PUSCH data based on the multiple uplink CG-based PUSCH configurations includes one or a combination of following manners: determining the first transmission occasion among transmission occasions corresponding to the cooperative uplink CG-based PUSCH configuration corresponding to the direction of the first TRP as the first transmission occasion for the CG-based multi-TPR cooperative PUSCH transmission; determining the first transmission occasion among transmission occasions corresponding to the first cooperative uplink CG-based PUSCH configuration corresponding to the direction of the first TRP among the at least one TRP as the first transmission occasion for the CG-based multi-TPR cooperative PUSCH transmission; determining the first transmission occasion among transmission occasions corresponding to the first cooperative uplink CG-based PUSCH configuration corresponding to the direction of any non-first TRP among the at least one TRP as the first transmission occasion for the CG-based multi-TPR cooperative PUSCH transmission.

In one embodiment, the transmission configuration parameter includes a parameter of startingFromRV0, and the parameter of startingFromRV0 is configured to be on. The initial reception position is determined based on the starting position of any transmission occasion with a corresponding rate matching parameter being RV0 among the at least one transmission occasion.

In one embodiment, determining the initial reception position based on the starting position of any transmission occasion with the corresponding rate matching parameter being RV0 among the at least one transmission occasion in response to performing data transmission of the single uplink CG-based PUSCH configuration includes one of the following manners or a combination thereof: determining a starting position of any transmission occasion with a rate matching parameter being RV0 corresponding to all the transmission occasions corresponding to the at least one TRP as an initial reception position for data transmission of the single uplink CG-based PUSCH configuration; determining a starting position of any transmission occasion with a rate matching parameter being RV0 corresponding to a direction of a first TRP among the at least one TRP as an initial reception position for data transmission of the single uplink CG-based PUSCH configuration. The first TRP includes one of: a first TRP that is not reversed among the at least one TRP; a first TRP that is reversed among the at least one TRP; any non-first TRP among the at least one TRP.

In one embodiment, determining the initial reception position based on a starting position of any transmission occasion with a corresponding rate matching parameter being RV0 among the at least one transmission occasion in response to cooperative repetition of PUSCH data based on a plurality of uplink CG-based PUSCH configurations includes one of the following manners or a combination thereof: determining a starting position of any transmission occasion with a rate matching parameter being RV0 on an uplink CG-based PUSCH corresponding to a transmission of a first TRP that is not reversed among the at least one TRP as an initial reception position for data transmission of the plurality of uplink CG-based PUSCH configurations; determining a starting position of any transmission occasion with a rate matching parameter being RV0 on an uplink CG-based PUSCH corresponding to a transmission of a first TRP that is reversed among the at least one TRP as an initial reception position for data transmission of the plurality of uplink CG-based PUSCH configurations; determining a starting position of any transmission occasion with a rate matching parameter being RV0 on an uplink CG-based PUSCH corresponding to transmissions of all TRPs of the at least one TRP as an initial reception position for data transmission of the plurality of uplink CG-based PUSCH configurations.

It may be understood that the communication method for the uplink transmission of the PUSCH with the CG applied to the network device provided by the embodiments of the present disclosure is similar to the communication method for the uplink transmission of the PUSCH with the CG applied to the terminal, and the same content will not be described in detail herein.

It may be further understood that the communication methods for the uplink CG-based PUSCH provided by the embodiments of the present disclosure may be applied for interaction between the terminal and the network device to realize the multi-TRP transmission. In the interaction between the terminal and the network device to realize the multi-TRP transmission, the terminal and the network device each have relevant functions for implementing the above-mentioned embodiments, which will not be described in detail herein.

It should be noted that those skilled in the art may understand that the various implementations/examples described above may be used in conjunction with any foregoing embodiment or may be used independently. The principles for the case where they are used independently and for the case where they are applied in combination are similar. In the embodiments of the present disclosure, some embodiments are illustrated as a combination of embodiments used together. Those skilled in the art may understand that such an illustration shall not be construed as a limitation of the embodiments of the present disclosure.

Based on the same concept, in embodiments of the present disclosure, a communication device for uplink transmission of a PUSCH with a CG is provided.

It may be understood that, the communication device for the uplink transmission of the PUSCH with the CG provided by the embodiments of the present disclosure includes corresponding hardware structures and/or software modules for performing various functions in order to implement the above-mentioned functions. The embodiments of the present disclosure may be implemented in a form of hardware or a combination of hardware and computer software in combination with units and algorithm steps of each example disclosed in the embodiments of the present disclosure. Whether a function is performed by the hardware or by the hardware driven by the computer software depends on specific applications and design constraints of the technical solution. Those skilled in the art may use different methods to implement the described functions for each specific application, but such an implementation should not be regarded as extending beyond the scope of the technical solutions of the embodiments of the present disclosure.

FIG. 6 is a block diagram illustrating a communication device for uplink transmission of a PUSCH with a CG according to an embodiment. Referring to FIG. 6, the communication device 100 for the uplink transmission of the PUSCH with the CG includes a processing unit 101.

The processing unit 101 is configured to determine a transmission configuration parameter corresponding to at least one TRP, and determine an initial transmission position based on the transmission configuration parameter, the initial transmission position being for CG-based multi-TPR cooperative PUSCH transmission.

In one embodiment, the transmission configuration parameter at least includes at least one transmission occasion. The processing unit 101 is configured to determine the initial transmission position based on the at least one transmission occasion.

In one embodiment, the transmission configuration parameter includes a parameter of startingFromRV0, and the parameter of startingFromRV0 is configured to be off. The processing unit 101 is configured to determine a first transmission occasion based on the at least one transmission occasion, and determine the first transmission occasion as the initial transmission position.

In one embodiment, in response to cooperative repetition of PUSCH data based on a single uplink CG-based PUSCH configuration, the processing unit 101 is configured to determine the first transmission occasion based on the at least one transmission occasion in one of the following manners or a combination thereof: determining a first transmission occasion among all transmission occasions corresponding to the at least one TRP as a first transmission occasion for the single uplink CG-based PUSCH configuration; determining a first transmission occasion among transmission occasions corresponding to a direction of a first TRP of the at least one TRP as a first transmission occasion for the single uplink CG-based PUSCH configuration, where the at least one TRP includes N TRPs, an $i^{th}$ TRP among the N TRPs corresponds to an $i^{th}$ SRS resource set, where i is a positive integer greater than or equal to 1 and less than or equal to N, and a first SRS resource set is a resource set with a minimum SRS resource set identifier. The first TRP is determined in one of following manners: determining a first TRP that is not reversed among the at least one TRP via configuration signaling or indication signaling or a predefined manner as the first TRP; determining a first TRP that is reversed among the at least one TRP via configuration signaling or indication signaling or a predefined manner as the first TRP; determining any non-first TRP among the at least one TRP as the first TRP.

In one embodiment, in response to cooperative repetition of PUSCH data based on a plurality of uplink CG-based PUSCH configurations, the processing unit 101 is configured to determine the first transmission occasion based on the at least one transmission occasion in one of the following manners or a combination thereof: determining a first transmission occasion among transmission occasions corresponding to a cooperative uplink CG-based PUSCH configuration corresponding to a direction of a first TRP as a first transmission occasion for the CG-based multi-TPR cooperative PUSCH transmission; determining a first transmission occasion among transmission occasions corresponding to a first cooperative uplink CG-based PUSCH configuration corresponding to a direction of a first TRP among the at least one TRP as a first transmission occasion for the CG-based multi-TPR cooperative PUSCH transmission; determining a first transmission occasion among transmission occasions corresponding to a first cooperative uplink CG-based PUSCH configuration corresponding to a direction of any non-first TRP among the at least one TRP as a first transmission occasion for the CG-based multi-TPR cooperative PUSCH transmission.

In one embodiment, the transmission configuration parameter includes a parameter of startingFromRV0, and the parameter of startingFromRV0 is configured to be on. The processing unit 101 is configured to determine the initial transmission position based on a starting position of any transmission occasion with a corresponding rate matching parameter being RV0 among the at least one transmission occasion.

In one embodiment, in response to performing data transmission of a single uplink CG-based PUSCH configuration, the processing unit 101 is configured to determine the initial transmission position based on a starting position of any transmission occasion with the corresponding rate matching parameter being RV0 among the at least one transmission occasion in one of the following manners or a combination thereof: determining a starting position of any transmission occasion with a rate matching parameter being RV0 corresponding to all the transmission occasions corresponding to the at least one TRP as an initial transmission position for performing the data transmission of the single uplink CG-based PUSCH configuration; determining a starting position of any transmission occasion with a rate matching parameter being RV0 corresponding to a direction of a first TRP among the at least one TRP as an initial transmission position for performing the data transmission of the single uplink CG-based PUSCH configuration. The first TRP includes one of: a first TRP that is not reversed among the at least one TRP; a first TRP that is reversed among the at least one TRP; any non-first TRP among the at least one TRP.

In one embodiment, in response to cooperative repetition of PUSCH data based on a plurality of uplink CG-based PUSCH configurations, the processing unit 101 is configured to determine the initial transmission position based on a starting position of any transmission occasion with a corresponding rate matching parameter being RV0 among the at least one transmission occasion in one of the following manners or a combination thereof: determining a starting position of any transmission occasion with a rate matching parameter being RV0 on an uplink CG-based PUSCH corresponding to a transmission of a first TRP that is not reversed among the at least one TRP as an initial transmission position for performing data transmission of the plurality of uplink CG-based PUSCH configurations; determining a starting position of any transmission occasion with a rate matching parameter being RV0 on an uplink CG-based PUSCH corresponding to a transmission of a first TRP that is reversed among the at least one TRP as an initial transmission position for performing data transmission of the plurality of uplink CG-based PUSCH configurations; determining a starting position of any transmission occasion with a rate matching parameter being RV0 on an uplink CG-based PUSCH corresponding to transmissions of all TRPs of the at least one TRP as an initial transmission position for performing data transmission of the plurality of uplink CG-based PUSCH configurations.

In one embodiment, the processing unit 101 is further configured to perform a TRP reversing on a TRP corresponding to a transmission occasion for pending transmission in response to determining that the first TRP is any non-first TRP among the at least one TRP, and the uplink CG-based PUSCH is configured with no TRP reversing information.

FIG. 7 is a block diagram illustrating a communication device for uplink transmission of a PUSCH with a CG according to an embodiment. Referring to FIG. 7, the communication device 200 for the uplink transmission of the PUSCH with the CG includes a processing unit 201.

The processing unit 201 is configured to configure and determine a transmission configuration parameter corresponding to at least one TRP in response to configuring a plurality of TRPs for a terminal, and determining an initial reception position based on the transmission configuration parameter, the initial reception position being for CG-based multi-TPR cooperative PUSCH transmission.

In one embodiment, the transmission configuration parameter at least includes at least one transmission occasion. The processing unit 201 is configured to determine the initial reception position based on the at least one transmission occasion.

In one embodiment, the transmission configuration parameter includes a parameter of startingFromRV0, and the parameter of startingFromRV0 is configured to be off. The processing unit 201 is configured to determine the first transmission occasion based on the at least one transmission occasion, and determine the first transmission occasion as the initial reception position.

In one embodiment, in response to cooperative repetition of PUSCH data based on a single uplink CG-based PUSCH configuration, the processing unit 201 is configured to determine the first transmission occasion based on the at least one transmission occasion in one of the following manners or a combination thereof: determining a first transmission occasion among all transmission occasions corresponding to the at least one TRP as a first transmission occasion for the single uplink CG-based PUSCH configuration; determining a first transmission occasion among transmission occasions corresponding to a direction of a first TRP of the at least one TRP as a first transmission occasion for the single uplink CG-based PUSCH configuration, where the at least one TRP include N TRPs, an $i^{th}$ TRP among the N TRPs corresponds to an $i^{th}$ SRS resource set, where i is a positive integer greater than or equal to 1 and less than or equal to N, and a first SRS resource set is a resource set with a minimum SRS resource set identifier. The first TRP is determined in one of following manners: determining a first TRP that is not reversed among the at least one TRP via configuration signaling or indication signaling or a predefined manner as the first TRP; determining a first TRP that is reversed among the at least one TRP via configuration signaling or indication signaling or a predefined manner as the first TRP; determining any non-first TRP among the at least one TRP as the first TRP.

In one embodiment, in response to cooperative repetition of PUSCH data based on a plurality of uplink CG-based PUSCH configurations, the processing unit 201 is configured to determine the first transmission occasion based on the at least one transmission occasion in one of the following manners or a combination thereof: determining a first transmission occasion among transmission occasions corresponding to a cooperative uplink CG-based PUSCH configuration corresponding to a direction of a first TRP as a first transmission occasion for the CG-based multi-TPR cooperative PUSCH transmission; determining a first transmission occasion among transmission occasions corresponding to a first cooperative uplink CG-based PUSCH configuration corresponding to a direction of a first TRP among the at least one TRP as a first transmission occasion for the CG-based multi-TPR cooperative PUSCH transmission; determining a first transmission occasion among transmission occasions corresponding to a first cooperative uplink CG-based PUSCH configuration corresponding to a direction of any non-first TRP among the at least one TRP as a first transmission occasion for the CG-based multi-TPR cooperative PUSCH transmission.

In one embodiment, the transmission configuration parameter includes a parameter of startingFromRV0, and the parameter of startingFromRV0 is configured to be on. The processing unit 201 is configured to determine the initial reception position based on a starting position of any transmission occasion with a corresponding rate matching parameter being RV0 among the at least one transmission occasion.

In one embodiment, in response to performing data transmission of a single uplink CG-based PUSCH configuration, the processing unit 201 is configured to determine the initial reception position based on a starting position of any transmission occasion with a corresponding rate matching parameter being RV0 among the at least one transmission occasion in one of the following manners or a combination thereof: determining a starting position of any transmission occasion with a rate matching parameter being RV0 corresponding to all the transmission occasions corresponding to the at least one TRP as an initial reception position for the data transmission of the single uplink CG-based PUSCH configuration; determining a starting position of any transmission occasion with a rate matching parameter being RV0 corresponding to a direction of a first TRP among the at least one TRP as an initial reception position for the data transmission of the single uplink CG-based PUSCH configuration. The first TRP includes one of: a first TRP that is not reversed among the at least one TRP; a first TRP that is reversed among the at least one TRP; any non-first TRP among the at least one TRP.

In one embodiment, in response to cooperative repetition of PUSCH data based on a plurality of uplink CG-based PUSCH configurations, the processing unit 201 is configured to determine the initial reception position based on the starting position of any transmission occasion with the corresponding rate matching parameter being RV0 among the at least one transmission occasion in one of the following manners or a combination thereof: determining a starting position of any transmission occasion with a rate matching parameter being RV0 on an uplink CG-based PUSCH corresponding to a transmission of a first TRP that is not reversed among the at least one TRP as an initial reception position for data transmission of the plurality of uplink CG-based PUSCH configurations; determining a starting position of any transmission occasion with a rate matching parameter being RV0 on an uplink CG-based PUSCH corresponding to a transmission of a first TRP that is reversed among the at least one TRP as an initial reception position for data transmission of the plurality of uplink CG-based PUSCH configurations; determining a starting position of any transmission occasion with a rate matching parameter being RV0 on an uplink CG-based PUSCH corresponding to transmissions of all TRPs of the at least one TRP as an initial reception position for data transmission of the plurality of uplink CG-based PUSCH configurations.

With respect to the devices in the above embodiments, the specific manners for performing operations for individual modules therein have been described in detail in the embodiments regarding the communication method for the uplink transmission of the PUSCH with the CG, which will not be elaborated herein.

FIG. 8 is a block diagram illustrating a communication device for uplink transmission of a PUSCH with a CG according to an embodiment. For example, the device 300 can be a mobile phone, a computer, a digital broadcast terminal, a messaging device, a game console, a tablet device, a medical device, a fitness device, a personal digital assistant, or the like.

Referring to FIG. 8, the device 300 may include at least one of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include at least one processor 320 to execute instructions to perform all or part of the steps in the above described methods. Moreover, the processing component 302 may include at least one module which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, at least one power source, and any other components associated with generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and/or the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, a button and the like.

The button may include, but not limited to, a home button, a volume button, a starting button, and a locking button.

The sensor component 314 includes at least one sensor to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may further include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one embodiment, the communication component 316 receives a broadcast signal or broadcast associated information from an external broadcast management system via a broadcast channel. In one embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 300 may be implemented with at least one application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above described methods.

In an embodiment, there is further provided a non-transitory computer-readable storage medium (such as the memory 304) including instructions that, when executed by the processor 320 of the device 300, to perform any of the above-described methods. For example, the non-transitory computer-readable storage medium may be a ROM, a RAM, a CD-ROM, a magnetic tape, a floppy disc, an optical data storage device, and the like.

FIG. 9 is a block diagram illustrating a device for uplink transmission of a PUSCH with a CG according to an embodiment. For example, the device 400 may be a server. Referring to FIG. 9, the device 400 includes a processing component 422 and a memory resource represented by a memory 432. The processing component 422 may further include at least one processor. The memory resource is configured to store instructions executable by the processing component 422, such as an application program. The application program stored in the memory 432 may include at least one module corresponding to a set of instructions. In addition, the processing component 422 is configured to execute the instructions to perform the above method.

The device 400 further includes a power component 426 configured to operate a power management of the device 400, a wired or wireless network interface 450 configured to connect the device 400 to the network, and an input/output (I/O) interface 458. The device 400 may operate an operating system stored in the memory 432, such as Windows Server™, Mac OS X™, Unix™, Linux™, FreeBSD™, or the like.

In an embodiment, the device 400 may be implemented with at least one application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above described methods.

In an embodiment, there is further provided a non-transitory computer-readable storage medium (such as the memory 432) including instructions that, when executed by the processing component 422 of the device 400, to perform any of the above-described methods. For example, the non-transitory computer-readable storage medium may be a ROM, a RAM, a CD-ROM, a magnetic tape, a floppy disc, an optical data storage device, and the like.

It is further understood that "a plurality of" in the present disclosure refers to two or more, and other quantifiers are similar thereto. Term "and/or", which describes an associated relationship of associated objects, refers to three relationships. For example, A and/or B means that A exists alone, A and B exist at the same time, and B exists alone. A character "/" generally indicates that contextual objects are in an "or" relationship. Terms "a/an" and "the" in the singular form are intended to include plural forms, unless clearly indicated in the context otherwise.

It is further understood that terms such as "first", and "second" are used to describe various information, these information should not be limited by these terms. These terms are only used for distinguishing information of the same type from each other and do not denote a particular order or degree of importance. As a matter of fact, the terms such as "first", and "second" may be used interchangeably. For example, without departing from the scope of embodiments of the present disclosure, first information may also be referred to as second information, and similarly, the second information may also be referred to as the first information.

It is further understood that although operations are described in a specific order in the accompanying drawings in the embodiments of the present disclosure, it should not be understood that these operations are required to be performed in the specific order shown or in a serial order, or that all of the operations shown are required to be performed to obtain desired results. In some circumstances, multitasking and parallel processing may be advantageous.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or conventional technical means known in the art but not disclosed in the present disclosure. The specification and examples should be considered as explanatory only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only limited by the appended claims.

What is claimed is:

1. A communication method for uplink transmission of a physical uplink shared channel (PUSCH) with a configured grant (CG), performed by a terminal, comprising:

determining a transmission configuration parameter corresponding to two transmission reception points (TRPs); and determining an initial transmission position of the two TRPs based on the transmission configuration parameter, the initial transmission position being for CG-based multi-TRP PUSCH repetition;

wherein the initial transmission position is a first transmission occasion among all transmission occasions corresponding to the two TRPs, or the initial transmission position is a first transmission occasion among transmission occasions corresponding to a first sounding reference signal (SRS) resource set.

2. The communication method for the uplink transmission of the PUSCH with the CG according to claim 1, wherein the transmission configuration parameter comprises the transmission occasions; and wherein determining the initial transmission position based on the transmission configuration parameter comprises:

determining the initial transmission position based on the at least one-transmission occasions.

3. The communication method for the uplink transmission of the PUSCH with the CG according to claim 2, wherein the transmission configuration parameter comprises a parameter of startingFromRV0, and the parameter of startingFromRV0 is configured to be off; and wherein determining the initial transmission position based on the transmission occasions of the two TRPs comprises:

determining a first transmission occasion based on the transmission occasions of the two TRPs, and determining the first transmission occasion as the initial transmission position.

4. The communication method for the uplink transmission of the PUSCH with the CG according to claim 3, wherein repetition of PUSCH data is based on a single uplink CG-based PUSCH configuration, and determining the first transmission occasion based on the transmission occasions comprises one of following manners or a combination of the following manners:

determining a first transmission occasion among all transmission occasions corresponding to the two TRPs as a first transmission occasion for the single uplink CG-based PUSCH configuration;

determining a first transmission occasion among transmission occasions corresponding to a direction of a first TRP of the two TRPs as a first transmission occasion for the single uplink CG-based PUSCH configuration, wherein the two TRPs exist, an $i^{th}$ TRP of the two TRPs corresponds to an $i^{th}$ sounding reference signal (SRS) resource set, where i is a positive integer of 1 or 2, and a first SRS resource set is a resource set with a minimum SRS resource set identifier;

the first TRP is determined in one of following manners:

determining a first TRP that is not reversed of the two TRPs via configuration signaling or indication signaling or a predefined manner as the first TRP;

determining a first TRP that is reversed of the two TRPs via configuration signaling or indication signaling or a predefined manner as the first TRP;

determining any non-first TRP of the two TRPs as the first TRP.

5. The communication method for the uplink transmission of the PUSCH with the CG according to claim 3, wherein repetition of PUSCH data is based on a plurality of uplink CG-based PUSCH configurations, and determining the first transmission occasion based on the transmission occasions comprises one of following manners or a combination of the following manners:

determining a first transmission occasion among transmission occasions corresponding to a uplink CG-based PUSCH configuration corresponding to a direction of a first TRP as a first transmission occasion for the CG-based multi-TRP PUSCH repetition;

determining a first transmission occasion among transmission occasions corresponding to a first uplink CG-based PUSCH configuration corresponding to a direction of a first TRP of the two TRPs as a first transmission occasion for the CG-based multi-TRP PUSCH repetition;

determining a first transmission occasion among transmission occasions corresponding to a first uplink CG-based PUSCH configuration corresponding to a direction of any non-first TRP of the two TRPs as a first transmission occasion for the CG-based multi-TRP PUSCH repetition.

6. The communication method for the uplink transmission of the PUSCH with the CG according to claim 2, wherein the transmission configuration parameter comprises a parameter of startingFromRV0, and the parameter of startingFromRV0 is configured to be on; and wherein determining the initial transmission position based on the transmission occasions of the two TRPs comprises:

determining the initial transmission position based on a starting position of any transmission occasion with a corresponding rate matching parameter being RV0 among the transmission occasions of the two TRPs.

7. The communication method for the uplink transmission of the PUSCH with the CG according to claim 6, wherein data transmission of a single uplink CG-based PUSCH configuration is performed, and determining the initial transmission position based on the starting position of any transmission occasion with the corresponding rate matching parameter being RV0 among the transmission occasions comprises one of following manners or a combination of the following manners:

determining a starting position of any transmission occasion with a rate matching parameter being RV0 among all the transmission occasions corresponding to the two TRPs as an initial transmission position for performing the data transmission of the single uplink CG-based PUSCH configuration;

determining a starting position of any transmission occasion with a rate matching parameter being RV0 corresponding to a direction of a first TRP of the two TRPs as an initial transmission position for performing the data transmission of the single uplink CG-based PUSCH configuration;

wherein the first TRP comprises one of:

a first TRP that is not reversed of the two TRPs;

a first TRP that is reversed of the two TRPs;

any non-first TRP of the two TRPs.

8. The communication method for the uplink transmission of the PUSCH with the CG according to claim 6, wherein repetition of PUSCH data is based on a plurality of uplink CG-based PUSCH configurations, and determining the initial transmission position based on the starting position of any transmission occasion with the corresponding rate matching parameter being RV0 among the transmission occasions of the two TRPs comprises one of following manners or a combination of the following manners:

determining a starting position of any transmission occasion with a rate matching parameter being RV0 on an uplink CG-based PUSCH corresponding to a transmission of a first TRP that is not reversed of the two TRPs as an initial transmission position for performing data transmission of the plurality of uplink CG-based PUSCH configurations;

determining a starting position of any transmission occasion with a rate matching parameter being RV0 on an uplink CG-based PUSCH corresponding to a transmission of a first TRP that is reversed of the two TRPs as an initial transmission position for performing data transmission of the plurality of uplink CG-based PUSCH configurations;

determining a starting position of any transmission occasion with a rate matching parameter being RV0 on an uplink CG-based PUSCH corresponding to transmissions of the two TRPs as an initial transmission position for performing data transmission of the plurality of uplink CG-based PUSCH configurations.

9. The communication method for the uplink transmission of the PUSCH with the CG according to claim 4, further comprising:

performing a TRP reversing on a TRP corresponding to a transmission occasion for pending transmission, wherein it is determined that the first TRP is any non-first TRP of the two TRPs, and the uplink CG-based PUSCH is configured with no TRP reversing information.

10. A communication method for uplink transmission of a physical uplink shared channel (PUSCH) with a configured grant (CG), performed by a network device, comprising:

configuring and determining a transmission configuration parameter corresponding to two transmission reception points (TRPs), and determining an initial reception position of the two TRPs based on the transmission configuration parameter, wherein the two TRPs are configured for a terminal, and the initial reception position is for CG-based multi-TRP PUSCH repetition;

wherein the initial reception position is a first transmission occasion among all transmission occasions corresponding to the two TRPs, or the initial reception position is a first transmission occasion among transmission occasions corresponding to a first sounding reference signal (SRS) resource set.

11. The communication method for the uplink transmission of the PUSCH with the CG according to claim 10, wherein the transmission configuration parameter comprises the transmission occasions; and wherein determining the initial reception position based on the transmission configuration parameter comprises:

determining the initial reception position based on the transmission occasions.

12. The communication method for the uplink transmission of the PUSCH with the CG according to claim 11, wherein the transmission configuration parameter comprises a parameter of startingFromRV0, and the parameter of startingFromRV0 is configured to be off; and determining the initial reception position based on the transmission occasions of the two TRPs comprises:

determining a first transmission occasion based on the transmission occasions of the two TRPs, and determining the first transmission occasion as the initial reception position.

13. The communication method for the uplink transmission of the PUSCH with the CG according to claim 12, wherein repetition of PUSCH data is based on a single uplink CG-based PUSCH configuration, determining the first transmission occasion based on the transmission occasions comprises one of following manners or a combination of the following manners:

determining a first transmission occasion among all transmission occasions corresponding to the two TRPs as a first transmission occasion for the single uplink CG-based PUSCH configuration;

determining a first transmission occasion among transmission occasions corresponding to a direction of a first TRP of the two TRPs as a first transmission occasion for the single uplink CG-based PUSCH configuration, wherein the two TRPs exist, an $i^{th}$ TRP of the two TRPs corresponds to an $i^{th}$ SRS resource set, where i is a positive integer of 1 or 2, and a first SRS resource set is a resource set with a minimum SRS resource set identifier;

the first TRP is determined in one of following manners:

determining a first TRP that is not reversed of the two TRPs via configuration signaling or indication signaling or a predefined manner as the first TRP;

determining a first TRP that is reversed of the two TRPs via configuration signaling or indication signaling or a predefined manner as the first TRP;

determining any non-first TRP of the two TRPs as the first TRP.

14. The communication method for the uplink transmission of the PUSCH with the CG according to claim 12, wherein repetition of PUSCH data is based on a plurality of uplink CG-based PUSCH configurations, and determining the first transmission occasion based on the transmission occasions comprises one of following manners or a combination of the following manners:

determining a first transmission occasion among transmission occasions corresponding to a uplink CG-based PUSCH configuration corresponding to a direction of a first TRP as a first transmission occasion for the CG-based multi-TRP PUSCH repetition;

determining a first transmission occasion among transmission occasions corresponding to a first uplink CG-based PUSCH configuration corresponding to a direction of a first TRP of the two TRPs as a first transmission occasion for the CG-based multi-TRP PUSCH repetition;

determining a first transmission occasion among transmission occasions corresponding to a first uplink CG-based PUSCH configuration corresponding to a direction of any non-first TRP of the two TRPs as a first transmission occasion for the CG-based multi-TRP PUSCH repetition.

15. The communication method for the uplink transmission of the PUSCH with the CG according to claim 11, wherein the transmission configuration parameter comprises a parameter of startingFromRV0, and the parameter of startingFromRV0 is configured to be on; and determining the initial reception position based on the transmission occasions of the two TRPs comprises:

determining the initial reception position based on a starting position of any transmission occasion with a corresponding rate matching parameter being RV0 among the transmission occasions of the two TRPs.

16. The communication method for the uplink transmission of the PUSCH with the CG according to claim 15, wherein data transmission of a single uplink CG-based PUSCH configuration is performed, and determining the initial reception position based on the starting position of any transmission occasion with the corresponding rate matching parameter being RV0 among the transmission occasions comprises one of following manners or a combination of the following manners:

determining a starting position of any transmission occasion with a rate matching parameter being RV0 among all the transmission occasions corresponding to the two TRPs as an initial reception position for the data transmission of the single uplink CG-based PUSCH configuration;

determining a starting position of any transmission occasion with a rate matching parameter being RV0 corresponding to a direction of a first TRP of the two TRPs as an initial reception position for the data transmission of the single uplink CG-based PUSCH configuration;

wherein the first TRP comprises one of:

a first TRP that is not reversed of the two TRPs;

a first TRP that is reversed of the two TRPs;

any non-first TRP of the two TRPs.

17. The communication method for the uplink transmission of the PUSCH with the CG according to claim 15, wherein repetition of PUSCH data is based on a plurality of uplink CG-based PUSCH configurations, and determining the initial reception position based on the starting position of any transmission occasion with the corresponding rate matching parameter being RV0 among the transmission occasions of the two TRPs comprises one of following manners or a combination of the following manners:

determining a starting position of any transmission occasion with a rate matching parameter being RV0 on an uplink CG-based PUSCH corresponding to a transmission of a first TRP that is not reversed of the two TRPs as an initial reception position for data transmission of the plurality of uplink CG-based PUSCH configurations;

determining a starting position of any transmission occasion with a rate matching parameter being RV0 on an uplink CG-based PUSCH corresponding to a transmission of a first TRP that is reversed of the two TRPs as an initial reception position for data transmission of the plurality of uplink CG-based PUSCH configurations;

determining a starting position of any transmission occasion with a rate matching parameter being RV0 on an uplink CG-based PUSCH corresponding to transmissions of the two TRPs as an initial reception position for data transmission of the plurality of uplink CG-based PUSCH configurations.

18. A terminal, comprising:

a processor; and a memory for storing processor-executable instructions;

wherein the processor is configured to perform a communication method for a physical uplink shared channel (PUSCH) with a configured grant (CG), comprising:

determining a transmission configuration parameter corresponding to two transmission reception points (TRPs); and determining an initial transmission position of the two TRPs based on the transmission configuration parameter, the initial transmission position being for CG-based multi-TRP PUSCH repetition;

wherein the initial transmission position is a first transmission occasion among all transmission occasions corresponding to the two TRPs, or the initial transmission position is a first transmission occasion among transmission occasions corresponding to a first sounding reference signal (SRS) resource set.

19. A network device, comprising:

a processor; and a memory for storing processor-executable instructions;

wherein the processor is configured to perform the communication method for the uplink transmission of the PUSCH with the CG according to claim 10.

20. A non-transitory computer-readable storage medium having instructions that, when executed by a processor of a terminal, cause the terminal to perform the communication method for the uplink transmission of the PUSCH with the CG according to claim 1.

* * * * *